United States Patent [19]

Joel, Jr.

[11] 3,811,118

[45] May 14, 1974

[54] INTERMEDIUM MAGNETIC DOMAIN LOGIC CONTROL ARRANGEMENT

[75] Inventor: Amos Edward Joel, Jr., South Orange, N.J.

[73] Assignee: Bell Telephone Laboratories, Incorporated, Murray Hill, N.J.

[22] Filed: Dec. 22, 1972

[21] Appl. No.: 317,649

[52] U.S. Cl. .................. 340/174 TF, 340/174 SR

[51] Int. Cl. .................. G11c 11/14

[58] Field of Search .................. 340/174 TF

[56] References Cited

UNITED STATES PATENTS 3,736,577 5/1973 Chang .................. 340/174 TF

*Primary Examiner*—James W. Moffitt

*Attorney, Agent, or Firm*—David H. Tannenbaum

[57] ABSTRACT

In magnetic domain technology, to achieve logic operations, a magnetically soft overlay is constructed to provide interaction points where a control domain and a controlled domain, each moving in the same substrate, come into close proximity with each other. Logic results from the magnetic interaction between the domains. An arrangement is disclosed where the control domain can be propagated in a substrate separate from the substrate in which the controlled domain moves. In one embodiment, a control domain is propagated to the edge of the controlling substrate, which edge is mounted in close physical relationship with the surface of the substrate in which the domain to be controlled is moving. Magnetic coupling between the domains, each in different substrates, provides the necessary logic control.

17 Claims, 6 Drawing Figures

INTERMEDIUM MAGNETIC DOMAIN LOGIC CONTROL ARRANGEMENT

BACKGROUND OF THE INVENTION

A magnetic domain selective control arrangement is disclosed which provides for the logic control of domains propagated in one magnetic medium under the influence of magnetic domains propagated in a second medium.

It is customary in the magnetic domain art to control the movement of the domains through a medium under the influence of a reorienting magnetic field. An overlay pattern of elements constructed of a magnetically soft material is typically placed on the surface of the magnetic medium or substrate. The elements of the pattern are so constructed that different portions of the elements become attractive to the domains during different orientations of the magnetic field. Thus, due to the continually changing magnetic influences exerted on the domains, they are caused to move through the substrate in a selectively controlled fashion.

When logic functions are to be performed, it has become typical to arrange the pattern of elements to form an interaction point. Each such interaction point is in essence an intersection between two domain paths such that the presence of a domain in one of the paths magnetically influences the domain in the other path. Thus, the magnetic repulsion forces which naturally occur between two domains in the same substrate are used to overcome the magnetic influence exerted by the element patterns. When the two interaction domains are coincident at a particular interaction point, one of the domains (the controlled domain) is forced along a certain path, and when the domains are not coincident at that interaction point the controlled domain will move along a different path. In this way, logic control is achieved.

Although under many circumstances such an arrangement is acceptable and yields a vast degree of flexibility in the performance of logic operations, and is of particular importance in the spatial distribution of domains in a substrate, a problem exists when it is desired to propagate the control domains at a rate different from the rate of the controlled domains. This results from the fact that all domains moving under the influence of the same reorienting magnetic field propagate at the same rate. Indeed, in the prior art, extensive use has been made of just this property. For an example of such usage see the copending application of A. J. Perneski and R. M. Smith, Ser. No. 89,631, filed on Nov. 16, 1970.

Accordingly, a problem exists when it is necessary to interact two magnetic domains under conditions where it is required to move the controlled domain at a rate different from the rate of movement of the controlling domain.

Thus, it is an object of my invention to provide an arrangement whereby magnetic domains may be logically controlled by other magnetic domains in a manner which allows the controlled and controlling domains to each be propagated at rates independent from each other.

It is a further object of my invention to provide domain interaction points for the logical control of domain informational representations arranged such that the controlling domains and the controlled domains are each free to propagate at speeds independent from each other, and further arranged such that the various controlling domains are also free to propagate at independent rates.

It is a still further object of my invention to utilize independently controllable magnetic domains to establish the spatial distribution of domains in a substrate.

SUMMARY OF THE INVENTION

In one specific embodiment of my invention I arrange a magnetic domain propragation substrate in a manner such that magnetic domains may be moved through the substrate in response to a reorienting magnetic field. Logic control of the propagated domains is accomplished by mounting a second substrate in conjunction with the first substrate in a manner such that domains which are propagated to the edge of the second substrate will magnetically influence domains at certain regions within the first substrate.

Propagation of the magnetic domain in each substrate is accomplishd by an overlay pattern of elements which define domain control channels or paths. These elements operate in the now well-known manner, as is described in U.S. Pat. No. 3,534,347 issued to A. H. Bobeck on Oct. 13, 1970, such that in response to each reorientation of the magnetic field each domain advances one space. In the controlling substrate, which in one embodiment is constructed perpendicular to the controlled substrate, the elements are arranged to propagate domains to the edge that is physically closest to the first or controlled substrate. In the controlled substrate, the elements are arranged so that the domains in a channel follow that channel until they arrive at an interaction point. Each interaction point is arranged with at least two possible output paths. One of the output paths is termed the easy or preferred path while the other path is termed the hard path. In the absence of any external force acting on a domain, other than the force created by the reorienting magnetic field, that domain, upon reaching an interaction point, will follow the easy output path.

My arrangement is constructed so that a domain at the edge of the controlling substrate is in proximity to the interaction point defined in the controlled substrate and is magnetically coupleable to a domain in the controlled substrate. Thus, logical operations are accomplished in the controlled substrate under control of the selective propagation of domains in the controlling substrate.

In the illustrative embodiment, T and bar-shaped overly elements are utilized to define the domain propagation channels and interaction points so that domains are propagated along the channels under control of the geometric structure of the elements and the repulsive forces of coincident domains all in response to a rotating in-plane field.

Accordingly, it is one feature of my invention that the domains propagated in one magnetic domain substrate are controllable from the selective movement of domains in another substrate.

It is a further feature of my invention that there is provided a structure which allows interacting magnetic domains to be propagated at rates independent from each other.

DESCRIPTION OF THE DRAWING

The operation and utilization of the present invention will be more fully apparent from the following description of the drawing in which.

Figure 2:
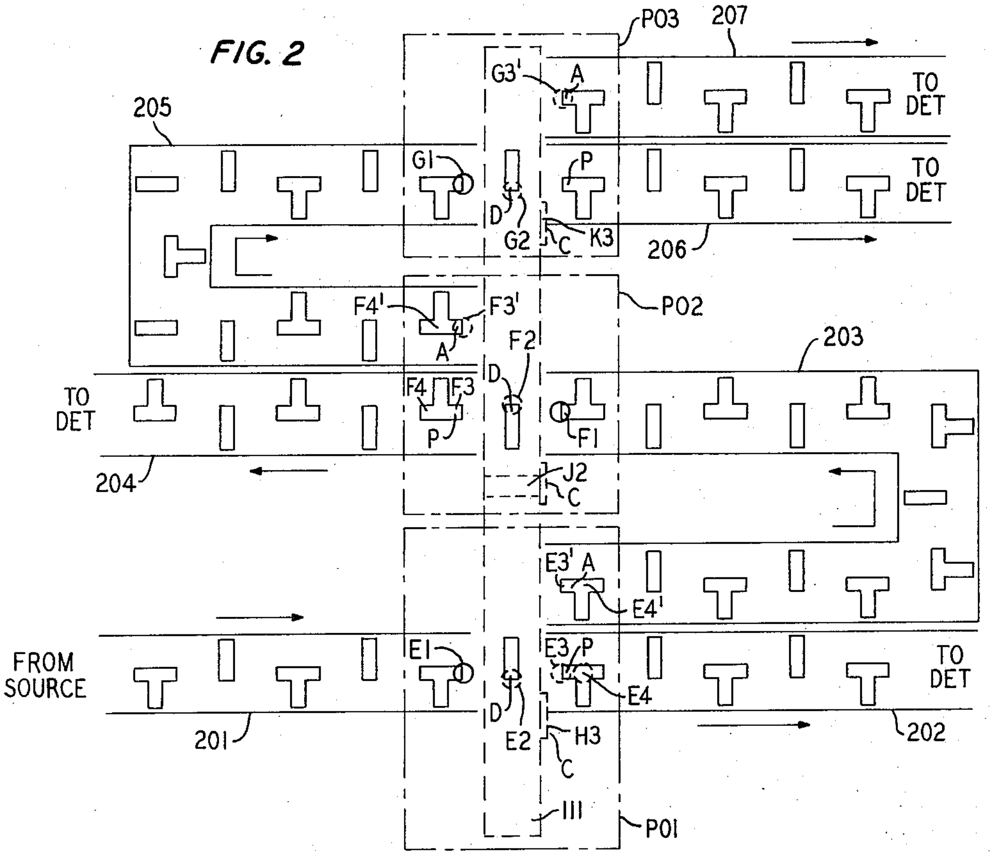
FIG. 2 is a schematic representation of the logic performed by the illustration in FIG. 1.

It will be noted that in FIG. 2 a systematic designation has been employed to illustrate the movement of domains from position to position and to facilitate a more complete understanding of the illustrative embodiment of the invention. Thus, a domain which is in a certain position at an arbitrary starting time is shown as a solid circle. As that domain moves from position to position along a defined channel of elements in response to a continuously changing magnetic field, broken circles are used for illustration. The letter associated with the position, such as letter E in FIG. 2, serves to identify the position and to identify any domain thereat. The number associated with each such letter at a specific position represents the number of that position counting from an arbitrary starting position. Thus, corresponding numbers between domains in separate channels having coordinated starting positions indicate synchronously coordinated positions between the channels. The prime sign (') is used to denote an alternate position for a domain in the associated time slot. Thus, as shown in FIG. 2, position E3 is the position in which the E domain will be two positions after a starting position E1 if no force other than the force created by the reorienting magnetic field is applied thereto. This path is called the preferred path of the domain and is marked symbolically by the letter P. When a domain encounters some other force, such as the repulsive force of a domain at a control point C (FIG. 2, position H3), instead of moving from the decision point D (FIG. 2, position E2) to the preferred point P (FIG. 2, position E3) the E2 domain moves to the alternate point A (FIG. 2, position E3'). The movement into the prime channel is termed the alternate path of the domain.

Figure 1:
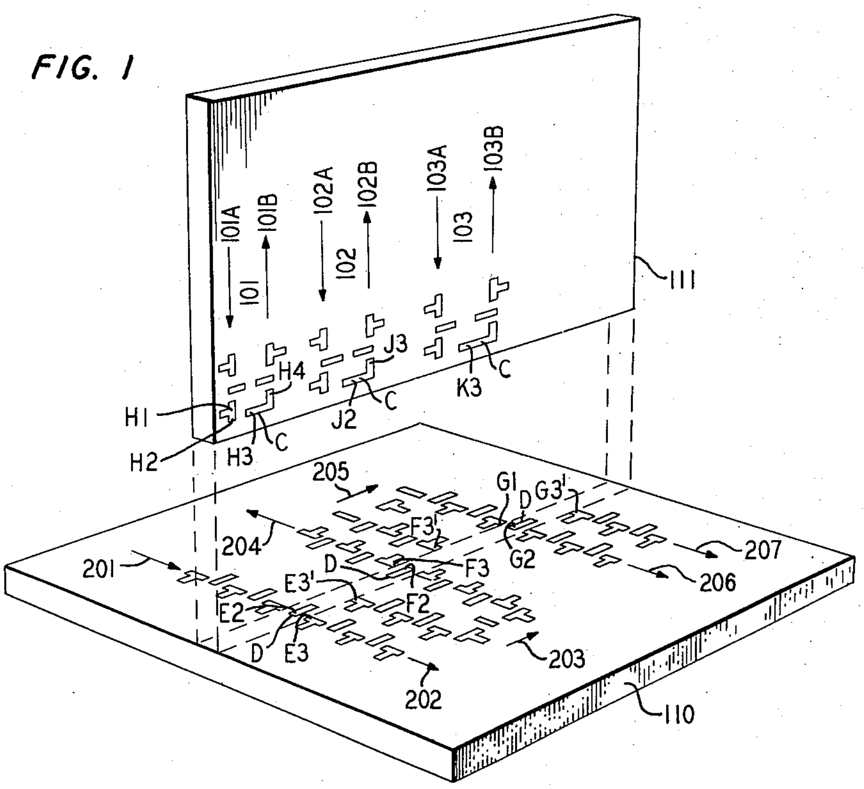
FIG. 1 is a pictorial illustration of domain logic control in a horizontal substrate as a result of domain movement in an intersecting vertical substrate.

The A, D, P and C points of each interaction point are utilized, as shown in FIGS. 1 and 2, to schematically represent the domain positions which are in coordinated relationship with each other to take advantage of the repulsive forces between domains. Thus, as shown with respect to interaction point PO1, FIG. 2, point D represents the position of the domain at which a decision is required. Point P denotes the preferred position to which the domain from point D will move if no force other than the force created by the reorienting magnetic field is applied thereto. Point C denotes the position controlling the domain movement from point D such that when domains are concurrently at points C and D, the point D domain will move to the alternate position A at the next reorientation of the magnetic field. The precise manner in which the movement of domains at an interaction point such as at interaction point PO1 is controlled will be discussed in more detail hereinafter.

GENERAL DESCRIPTION

Figure 3:
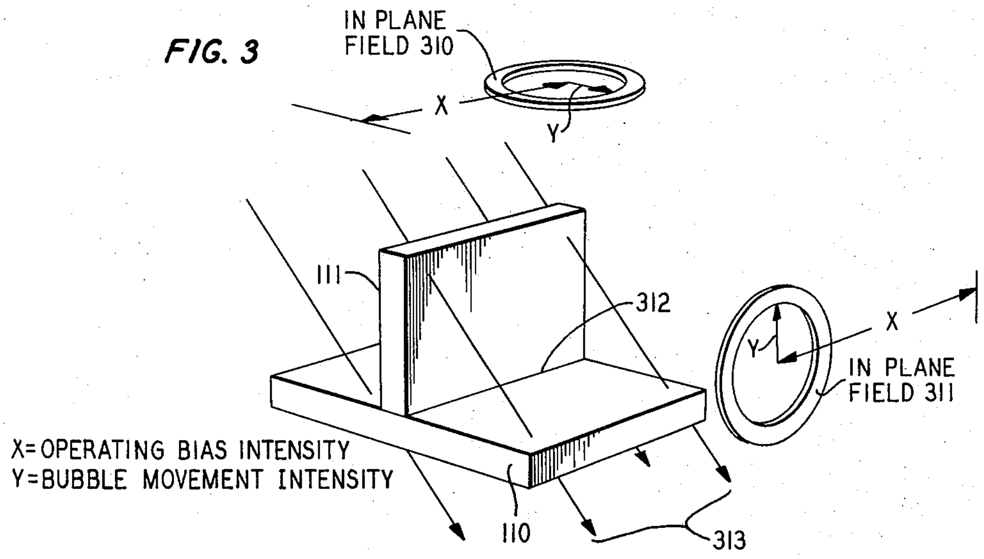
FIG. 3 is a pictorial illustration of the various magnetic forces utilized for domain movement.

As shown in FIG. 3, substrate 110 comprises a slice of magnetic material in which magnetic domains may be propagated under control of in-plane field 310. Substrate 111 comprises a slice of magnetic material in which magnetic domains may be propagated under control of in-plane field 311. These substrates are mounted in a manner such that one edge, edge 312, of substrate 111 is parallel to and in close proximity to the surface of substrate 110. Ideally, these substrates should be arranged perpendicular to each other with the edge 312 as mechanically close to the surface of substrate 110 as possible so that domains which are propagated to edge 312 of substrate 111 will magnetically interact with the magnetic domains propagating through substrate 110.

Force lines 313, shown in FIG. 3, represent the bias field which is exerted commonly on both substrates. The strength of the bias field acting on each substrate would be formed by the two in-plane fields and thus would be the square root of $X^2$, where X is the operating bias intensity. Using a common biasing field results in all of the domains established in substrate 110 having the same magnetic polarity as all of the domains established in substrate 111. This is an important requirement and is derived from the fact that the domains in substrate 111 will be used, in a manner to be more fully detailed hereinafter, to cause a change in the paths of domains moving in substrate 110.

Figure 4:
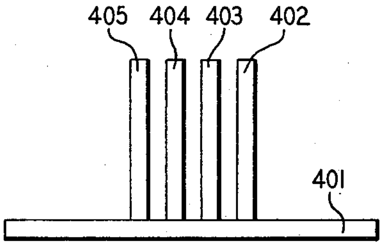
FIGS. 4, 5 and 6 are schematic representations of various planar arrangements, each providing control of domains in one plane by domains in another plane.
Figure 6:
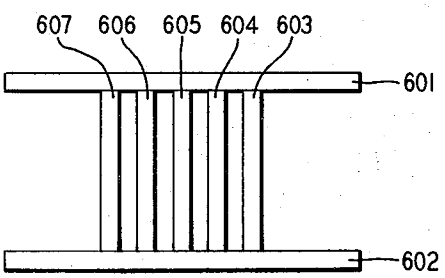

FIG. 4 shows alternate utilizations of my invention, illustrating that the edges of a number of perpendicular controlling substrates, such as substrates 402, 403, 404 and 405, may be used to control domain movement in one horizontal substrate, such as substrate 401. FIG. 6 shows that more than one such horizontal substrate, such as substrates 601 and 602, may be controlled by one or more perpendicular controlling substrates.

Figure 5:
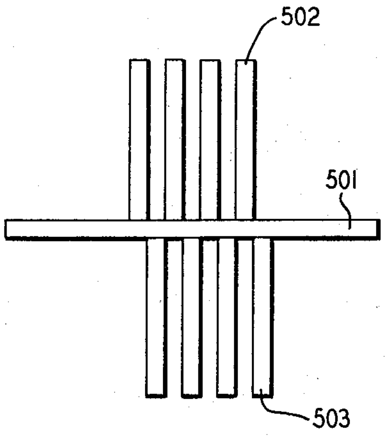

FIG. 5 illustrates the fact that domains in the controlled substrate 501 can be controlled from the edges of substrates, such as substrates 502 and 503, mounted on opposite surfaces of the controlled substrate.

For controlling the domains in each substrate, a magnetically soft overlay is juxtaposed with the domain propagation substrate to provide magnetic points which attract the domains. The magnetic points define the path or channel which is followed by a domain in response to the reorienting magnetic field. One such type of overlay, commonly referred to as a T and Bar overlay, is detailed in the above-mentioned Bobeck patent. The geometry of the overlay is constructed in such a manner that different points of the overlay become magnetically attractive to the domains during each of the four quadrants of the magnetic field reorientation.

FIG. 1 shows a controlling substrate 111 having an overlay pattern of elements on a surface for controlling domains within that substrate. The controlled substrate 110 also is shown having an overlay pattern of elements on a surface for controlling domains within that substrate. Close to the edge of the controlling substrate 111, one of the element positions is selected as a controlling or C position such that a domain in the C position will interact with a domain at a decision or D position of the controlled substrate 110 overlay. FIG. 2 shows in greater detail the overlay pattern of elements associated with the controlled substrate 110 with the C position of the controlling substrate 111, also shown in conjunction with each interaction point P01, PO2, and PO3.

DETAILED DESCRIPTION

Turning again to FIG. 1, substrate 111 is arranged, as discussed previously, such that domains are selectively controllable around three loops, 101, 102 and 103. Thus, domains propagating along the subchannel 101A will move through consecutive magnetic points of that channel in response to the reorienting magnetic in-plane field 311 (shown in FIG. 3). At an arbitrary starting point, a domain would be in position H1 and at the next reorientation of the magnetic field that domain would move to position H2, and during subsequent reorientations of the magnetic field the domain would move sequentially through positions H3 and H4 and thus along channel 101B. This operation is exactly as described in the aforementioned Bobeck patent.

For purposes of illustration, it shall be assumed that domains move in the same manner through channels 102 and 103 of substrate 111. In similar fashion, domains move in substrate 110, starting at the beginning of channel 201, and follow the overlay pattern detailed in FIG. 2. Thus, as shown in FIG. 2, when a domain arrives at point E2, there are two channels which that domain may follow; namely, channels 202 and 203. As discussed previously, the domain from point E2 will move to position E3 (which position is the starting position of channel 202) if no force other than the reorienting in-plane field 310 (shown in FIG. 3) is exerted on the E2 domain. If, however, some other magnetic force is exerted on the E2 domain, that domain will move instead to position E3′ (which position is the starting point of channel 203) at the next reorientation of the in-plane field.

In one embodiment of my invention, the edge of substrate 111 is brought into proximity with the surface of substrate 110 such that position H3 of substrate 111 is in close proximity to position E2 of substrate 110. Thus, if a domain is in position E2 concurrently with the presence of a domain in position H3, these domains will exert mutually repulsive forces on each other, thereby forcing the E2 domain to move to position E3′ at the next reorientation of the magnetic field. In this manner, a domain in one substrate is utilized to control the logic operations of a domain in a second substrate.

As shown in FIG. 1, domain positions H3, J3 and K3 are constructed such that when substrate 111 is mounted perpendicular to and against the surface of substrate 110, these positions are relatively close to positions E2, F3 and G2, respectively, of substrate 110. It will, of course, be obvious that since domains are, in effect, closed-wall magnetic areas which can be viewed as cylinders moving in the plane of the substrate, the control elements such as the T and Bar shown may be on one surface of the substrate while the logic control substrate, such as 111, may be brought into proximity with the other surface of the substrate.

Turning again to FIG. 2, assume now that domains are propagated along channel 201 from a source of domains to interaction point PO1. Accordingly, at some arbitrary starting time a domain arrives at position E1 of channel 201. At the next reorientation of the magnetic field, the E1 domain moves to position E2, which is the decision point of channel 201. Assuming that there is no domain at the control point C, which is position H3 of substrate 111, then at the next reorientation of the magnetic field the E2 domain moves to position E3, which is the preferred path. During subsequent reorientations of the magnetic field the domain which started along channel 201 moves along channel 202.

Now let us assume that the E2 domain at interaction point PO1 was forced along the hard path to position E3′ for subsequent propagation along channel 203. Accordingly, at some point the domain would arrive at position F1 of interaction point PO2. Also, now let us assume that a domain is propagated along channel 102 of substrate 111 to position J2 concurrently with the movement of the F1 domain to position F2. As discussed previously, the J2 and F2 domains will exert mutually repulsive forces on each other such that, at the next reorientation of the magnetic field, the F2 domain moves to position F3′ for subsequent propagation along channel 205. Concurrently with the movement of the F2 domain to position F3′, the J2 domain in substrate 111 moves to position J3, as shown in FIG. 1, and thereby continues around channel 102.

The domains propagated in channel 103 operate in conjunction with interaction point PO3 in the exact manner described above such that domains propagated to position G2 along channel 205 may either move to channel 206 or to channel 207 depending upon the absence or presence, respectively, of a domain in the control position K3 of channel 103.

The overlay of substrate 111 could be constructed so that when the J2 domain interacted with the F2 domain an alternate channel would be provided in substrate 111 for domain J2. This would merely be a variation of the basic concepts taught in this invention.

CONCLUSION

Following the teaching of this invention, numerous control arrangements would be possible. For example, since the domains moving in each of the substrates 110 and 111 move in response to a particular one of the in-plane fields 310 and 311, the domains in the controlling substrate could move at propagation rates different from the propagation rate of domains in the controlled channel and, in addition, at some interaction points the domains in the controlling substrate could actually be maintained at the C point in continual interaction with domains moving along the channels of the controlled substrate. Although, as shown in FIG. 2, all of the interaction points PO1, PO2 and PO3 are controlled from domains along the same edge of the controlling substrate, it would be obvious that multiple controlling substrates could be utilized where the domains in each of the controlling substrates would move in synchronization with each other and in synchronization with domains in the controlled substrate.

What is claimed is:

1. In combination, a first device in which magnetic domains may be propagated in response to the reorientations of a magnetic field, a second device in which magnetic domains may be propagated in response to the reorientations of a magnetic field, said second device forming an angle with said first device, and means including an edge of said first device and a plane surface of said second device for selectively interacting domains propagating in said first device with domains propagating in said second device.

2. The invention set forth in claim 1, wherein said first device is mounted perpendicular to said second device so that domains propagated to said edge of said first device are magnetically coupleable to selected domains within said second device.

3. The invention set forth in claim 2 wherein said selectively interacting means further includes an overlay of magnetically soft elements defining domain channels in said second device, said channels having interaction points therealong and each interaction point having an input channel and at least two possible output channels.

4. The invention set forth in claim 3 wherein each said interaction point has a decision point associated with said input channel, said decision point arranged such that a domain propagated along said input channel to said decision point would propagate from said decision point along a first one of said output channels associated with said decision point if no force other than the force created by the reorienting magnetic field is exerted thereon and arranged such that a domain propagated along said input channel to said decision point would propagate from said decision point along a second one of said output channels associated with said decision point if a magnetic force in addition to said reorienting magnetic field created force is exerted thereon, each said decision point having associated therewith a control point arranged such that a domain at said control point in conjunction with a domain at said decision point will cause said decision point domain to propagate along said second one of said output paths, and wherein said control point is contained within said first device.

5. In combination, a first magnetic medium through which magnetic domains can be moved, a pattern of magnetically soft elements arranged in conjunction with said first magnetic medium, a first reorienting magnetic field operable in cooperation with said elements to effect said movement, a plurality of interaction points defined by said elements, each said interaction point having at least two possible output paths and arranged such that a domain moving in said first medium will follow a selected one of said output paths depending upon the presence of a domain in certain fixed locations relative to said interaction point, and a second magnetic medium through which magnetic domains can be selectively moved, an edge of said second medium magnetically coupled with a plane surface of said first medium such that domains moving in said second medium can be brought into proximity with said first medium interaction points so as to control said domains moving in said first magnetic medium, said second magnetic medium forming an angle with said first magnetic medium.

6. The invention set forth in claim 5 wherein said second medium control domains are domains selectively moved to said edge of said second medium.

7. The invention set forth in claim 6 wherein said edge of said second medium is structurally secured to said plane surface of said first magnetic medium.

8. The invention set forth in claim 5 wherein said certain fixed locations are domain positions within said second magnetic medium.

9. The invention set forth in claim 8 wherein said second magnetic medium fixed positions are at an edge of said second medium.

10. The invention set forth in claim 9 wherein said edge of said second medium is structurally secured to a plane surface of said first magnetic medium.

11. A first slice of magnetic material in which single wall domains may be propagated in response to a magnetic field reorienting in the plane of said slice, said slice comprising means for controlling the positional movement of domains through said slice, a second slice of magnetic material in which single wall domains may be propagated in response to a magnetic field reorienting in the plane of said second slice, said second slice comprising means for controlling the positional movement of domains through said second slice, and said first and said second slice arranged perpendicular to each other such that magnetic domains propagated to an edge of said first slice of magnetic material will interact magnetically with selected domain positions within said second one of said magnetic material slices.

12. The invention set forth in claim 11 wherein said domains are established in each of said magnetic material slices under control of a single magnetic bias field.

13. The invention set forth in claim 11 further comprising a third slice of magnetic material in which single wall magnetic domains may be propagated in response to a magnetic field reorienting in the plane of said slice, means for controlling the positional movement of domains through said slice, and said third slice arranged perpendicular to said first slice of magnetic material such that magnetic domains propagated to an edge of said first slice of magnetic material will interact magnetically with domains at selected positions within said third magnetic material slice.

14. The invention set forth in claim 11 further comprising means operative in response to the magnetic interaction between domains in each of said magnetic material slices for controlling the logical movement of magnetic domains in said magnetic domain slices.

15. The invention set forth in claim 14 wherein said logically controlling means includes an overlay of magnetically soft material juxtaposed with a surface of said second one of said magnetic material slices.

16. The invention set forth in claim 15 wherein said first slice positional movement controlling means includes an overlay of magnetically soft material juxtaposed with a surface of said first magnetic material slice.

17. The invention set forth in claim 16 wherein said first magnetic material slice reorienting magnetic field is separably controllable from said second magnetic material slice reorienting magnetic field.

* * * * *